(12) United States Patent
Ito et al.

(10) Patent No.: US 9,145,104 B2
(45) Date of Patent: Sep. 29, 2015

(54) AIRBAG APPARATUS

(71) Applicants: DENSO CORPORATION, Kariya, Aichi-pref. (JP); Freescale Semiconductor, Inc., Austin, TX (US)

(72) Inventors: Masahiko Ito, Anjo (JP); Pierre Turpin, Toulouse (FR); Erwan Hemon, Goyrans (FR); Ahmed Hamada, Toulouse (FR)

(73) Assignees: DENSO CORPORATION, Kariya (JP); Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 14/204,069

(22) Filed: Mar. 11, 2014

(65) Prior Publication Data

US 2014/0277949 A1    Sep. 18, 2014

(30) Foreign Application Priority Data

Mar. 12, 2013 (JP) ................................. 2013-049263

(51) Int. Cl.
  *B60R 21/26* (2011.01)
  *B60R 21/017* (2006.01)
  *B60R 21/015* (2006.01)

(52) U.S. Cl.
  CPC .............. *B60R 21/26* (2013.01); *B60R 21/015* (2013.01); *B60R 21/017* (2013.01); *B60R 21/01524* (2014.10)

(58) Field of Classification Search
  CPC ........................ B60R 21/015; B60R 21/01524
  USPC ...................... 701/45; 280/735; 180/271, 273
  See application file for complete search history.

(56) References Cited

U.S. PATENT DOCUMENTS

| 2005/0269879 | A1* | 12/2005 | Hemon et al. ............... 307/10.1 |
| 2006/0038592 | A1  | 2/2006  | Inoue et al. |
| 2006/0217863 | A1  | 9/2006  | Ito |
| 2008/0164760 | A1* | 7/2008  | Hattori ........................... 307/64 |

FOREIGN PATENT DOCUMENTS

JP           2012124110     *  6/2012   ............ H30K 3/013

OTHER PUBLICATIONS

English Translation of JP 2012124110.*

* cited by examiner

*Primary Examiner* — Fadey Jabr
*Assistant Examiner* — Yazan A Soofi
(74) *Attorney, Agent, or Firm* — Harness, Dickey & Pierce, PLC

(57) ABSTRACT

An airbag apparatus connected with a battery includes activation circuits each of which has a squib and a high-side switching element, a safing switching element connected between the battery and the activation circuits, a safing switch control circuit controlling the safing switching element to provide a target voltage to the activation circuits, a terminal voltage acquiring circuit that acquires a terminal voltage of each squib, and a target voltage setting circuit that sets the target voltage. When a maximum-terminal voltage is lower than a reference voltage, the target voltage setting circuit sets the target voltage to be equal to the reference voltage. When the maximum-terminal voltage is higher than the reference voltage, the target voltage setting circuit sets the target voltage to correspond to the maximum-terminal voltage so that a reverse current is avoided in the high-side switching element.

7 Claims, 3 Drawing Sheets

AIRBAG APPARATUS

CROSS REFERENCE TO RELATED APPLICATION

This application is based on Japanese Patent Application No. 2013-049263 filed on Mar. 12, 2013, the disclosure of which is incorporated herein by reference.

TECHNICAL FIELD

The present disclosure relates to an airbag apparatus for protecting a vehicle occupant.

BACKGROUND

As disclosed in US 2005/0269879 A1, recently, vehicles have been equipped with an airbag apparatus to protect a vehicle occupant. The airbag apparatus inflates an airbag when a vehicle crashes. The airbag apparatus disclosed in US 2005/0269879 A1 includes a safing switching element (safing switch). The safing switch regulates a voltage supplied from a power source, such as a battery, to a target voltage, and supplies the regulated voltage to a circuit (activation circuit) that provides a current to fire a squib. Hereinafter, the voltage supplied from the power source is also referred to as a supply voltage. The activation circuit includes the squib, and a high side switching element (high side switch) that regulates a current flowing through the squib. The high side switch has an input terminal connected with an output terminal of the safing switch, and an output terminal connected with the squib. Usually, the airbag apparatus includes multiple above-described activation circuits, and the output terminal of the safing switch is connected with the input terminal of the high side switch of each activation circuit.

In the above-described airbag apparatus, a short circuit may occur in a wire connecting the high side switch with the squib (squib line), causing the supply voltage from the battery to be directly applied to the squib line. When the short circuit occurs, the target voltage becomes lower than the supply voltage supplied by the battery. The target voltage, which is lower than the supply voltage, may cause the following problems. In one of the activation circuits, when the short circuit occurs, the output terminal of the high side switch has a voltage higher than the input terminal of the high side switch. Thus, the current may flow from the input terminal of the high side switch to another activation circuit, and a reverse current is generated and flows through the high side switch. In this state, when the high side switch of another activation circuit is turned on, the current flows from the battery to another activation circuit via the high side switch of the short-circuited activation circuit. This reverse current may concentrate on the high side switch of the short-circuited activation circuit, causing it to break. If the high side switch of the short-circuited activation circuit breaks, an integrated circuit including the high side switch may also break, and proper operation of the other activation circuits may be affected.

In order to prevent breakage of the high side switch of the short-circuited activation circuit due to the reverse current, the target voltage is set higher than a maximum supply voltage of the battery.

When the target voltage is set higher than the maximum supply voltage of the battery, the high side switch used in the activation circuit is required to allow the target voltage to be higher than the maximum supply voltage of the battery. As is well known, a size of the high side switch increases with an increase in an allowable voltage of the high side switch. Thus, when target voltage is set higher than the maximum supply voltage of the battery, the size of the high side switch of the activation circuit increases. Accordingly, a size of the activation circuit increases.

SUMMARY

In view of the foregoing difficulties, it is an object of the present disclosure to provide an airbag apparatus in which a reverse current flowing through a high side switching element is restricted and so that the size of an activation circuit is unnecessarily increased.

According to an aspect of the present disclosure, an airbag apparatus, which is connected with a battery, includes a plurality of activation circuits, a safing switching element, a safing switch control circuit, a terminal voltage acquiring circuit, and a target voltage setting circuit. Each of the activation circuits includes a squib having a first end and a second end, a high side switching element connected with the first end of the squib, and a high side switch control circuit that drives and controls the high side switching element so that a predetermined activation current flows through the squib. The safing switching element is connected between the battery and the activation circuits. The safing switch control circuit drives and controls the safing switching element to provide a target voltage to each of the activation circuits. The terminal voltage acquiring circuit acquires a plurality of terminal voltages respectively output from the activation circuits. Each of the terminal voltages is provided by at least one of a voltage at the first end of the squib or a voltage at the second end of the squib. The target voltage setting circuit sets the target voltage to be provided to each of the activation circuits. The target voltage setting circuit receives a reference voltage that is necessary for generating the activation current to flow through the squib, and the reference voltage is lower than a maximum output voltage of the battery. The terminal voltage acquiring circuit compares the reference voltage with a maximum terminal voltage that has a maximum value among the terminal voltages. When the maximum terminal voltage is lower than the reference voltage, the target voltage setting circuit sets the target voltage to be equal to the reference voltage. When the maximum terminal voltage is higher than the reference voltage, the target voltage setting circuit sets the target voltage to correspond to the maximum terminal voltage so that a reverse current is avoided in the high side switching element.

With the above airbag apparatus, a reverse current flowing through the high side switching element is restricted and a size of the activation circuit need not be unnecessarily increased.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

The following will describe embodiments of the present disclosure with reference to accompanying drawings.

Figure 1:
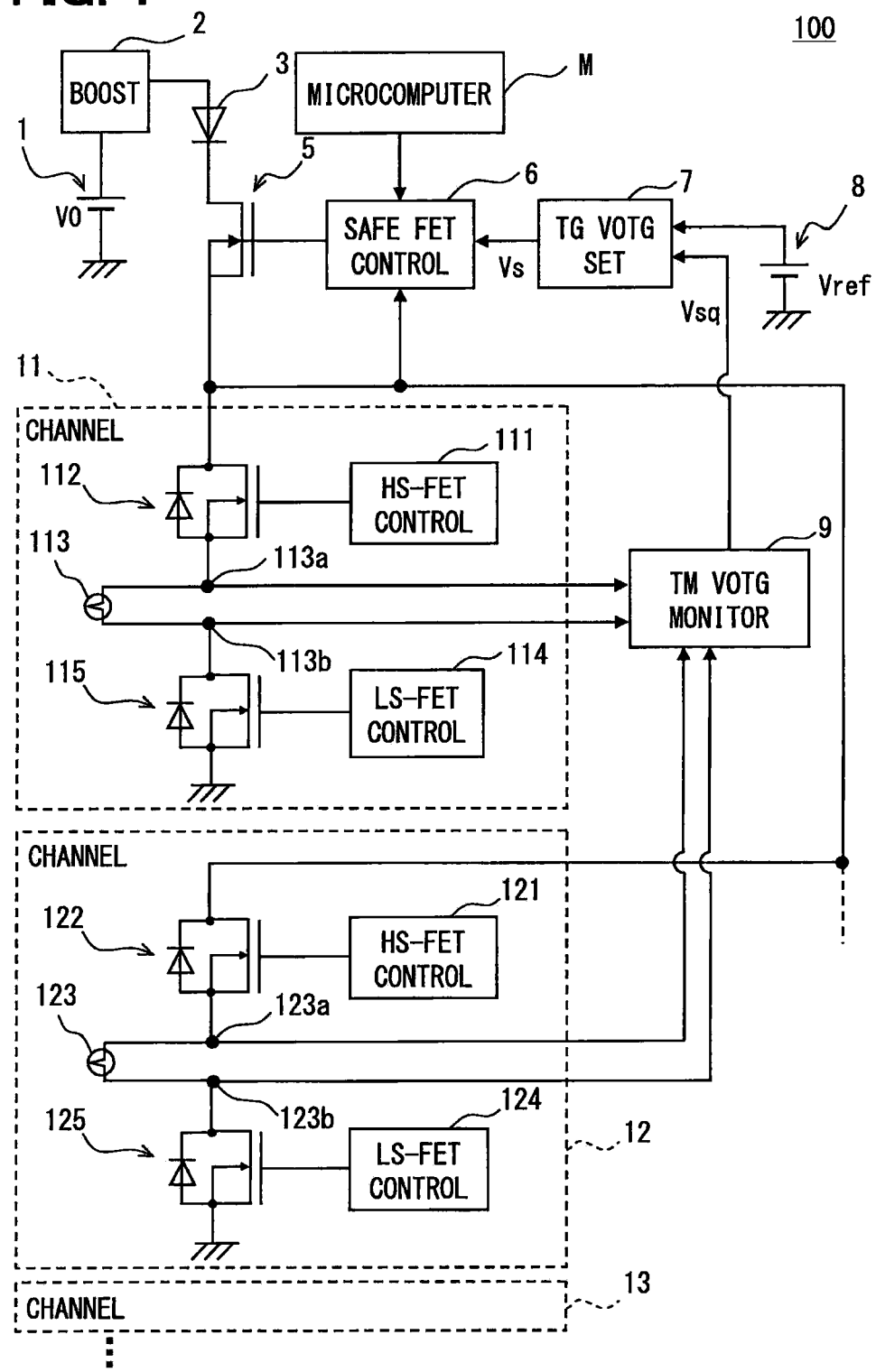
FIG. 1 is a circuit diagram showing a configuration of an airbag apparatus according to an embodiment of the present disclosure.

FIG. 1 shows a configuration of an airbag apparatus 100 according to an embodiment of the present disclosure. As shown in FIG. 1, the airbag apparatus 100 includes a battery 1, a boosting circuit (BOOST) 2, a diode 3 for preventing a reverse current, a microcomputer M, a safing field effect transistor (safing FET) 5, a safing FET control circuit (SAFE FET CONTROL) 6 for controlling the safing FET 5, a target voltage setting circuit (TG VOTG SET) 7, a reference power supplying section 8, a terminal voltage monitoring section (TM VOTG MONITOR) 9, and multiple channels 11 to 13. The multiple channels 11 to 13 have the same configuration, and each of the channels 11 to 13 functions as an activation circuit that controls a current flowing through a squib so that the squib is fired by the current. For example, the channel 11 includes a first control circuit (HS-FET CONTROL) 111, a high side FET 112, a squib 113, a second control circuit (LS-FET CONTROL) 114, and a low side FET 115. The first control circuit 111 controls the high side FET 112, and the second control circuit 114 controls the low side FET 115. Since the channel 12 and the channel 13 have the same configuration with the channel 11, a description of the channel 12 and the channel 13 will be omitted.

The battery 1 functions as a power supply source of the airbag apparatus 100 and may be provided by a secondary battery, which outputs a voltage Vo having a rated value of 12 volts (V). The battery 1 has a negative electrode terminal connected with a body of a vehicle and a positive electrode terminal connected with the boosting circuit 2. The boosting circuit 2 boosts the direct voltage Vo supplied from the battery 1 and outputs the boosted voltage. The boosting circuit 2 may output a voltage having a value of 25 V. The boosting circuit 2 has an output terminal that is connected with a drain terminal of the safing FET 5 via the diode 3. The battery 1 also supplies power to other electric loads (not shown). Thus, the battery 1 may output a voltage Vo higher than the rated value 12 V caused by a variation in the electric loads connected to the battery 1. Thus, in the present embodiment, a maximum value of the output voltage Vo of the battery 1 is estimated to 16 V.

When the microcomputer M detects a crash of the vehicle based on output signals of multiple sensors (not shown) with which the vehicle is equipped, the microcomputer M outputs an activation command to the safing FET control circuit 6 in order to fire the squib 113, 123. Further, the microcomputer M outputs the activation command to the first control circuit 111, 121 and the second control circuit 114, 124 of each channel 11, 12, 13 in order to fire the squib 113, 123. An output terminal of the microcomputer M is connected with a first input terminal of the safing FET control circuit 6. The output terminal of the microcomputer M is also connected with an input terminal of each of the control circuits including the first control circuits 111, 121 and the second control circuits 114, 124 included in the multiple channels 11, 12, 13. In the present embodiment, the input terminal and the output terminal of each component included in the airbag apparatus 100 is specified as corresponding to a subject component or a target component to be connected with the subject component. Further, a communication among the components of the airbag apparatus 100 may be performed using a serial peripheral interface (SPI). In FIG. 1, signal lines between the microcomputer M and each of the first control circuits 111, 121 and the second control circuits 114, 124 are not shown in order to simplify the drawing. Further, a circuit capable of outputting the activation command in order to activate the airbag apparatus 100 in response to detection of the vehicle crash may also be used instead of the microcomputer M. Further, in the present embodiment, the microcomputer M includes a well-known microcomputer and an application specific integrated circuit (ASIC).

The safing FET 5 is a switching element that is connected with the boosting circuit 2 via the diode 3. The safing FET 5 controls a voltage to be supplied to each channel 11, 12, 13 from the battery 1. The drain terminal of the safing FET 5 is connected with the diode 3. A source terminal of the safing FET 5 is connected with a drain terminal of the high side FET 112, 122 of each channel 11, 12, 13. The source terminal of the safing FET 5 is also connected with a second input terminal of the safing FET control circuit 6. A gate terminal of the safing FET 5 is connected with an output terminal of the safing FET control circuit 6. In the present embodiment, the safing FET 5 is provided by an N-channel metal oxide semiconductor field effect transistor (MOS-FET). Further, the safing FET 5 may be provided by a different well-known switching element. The safing FET 5 functions as a safing switching element.

When the safing FET control circuit 6 receives the activation command from the microcomputer M, the safing FET control circuit 6 controls the safing FET 5 to output a voltage equal to a target voltage Vs from the source terminal. The target voltage Vs is set by the target voltage setting circuit 7. As described above, the safing FET control circuit 6 has the first input terminal to receive signals from the microcomputer M, the second input terminal to receive feedback signals from the safing FET 5. Further, the safing FET control circuit 6 has a third input terminal to receive signals related to the target voltage Vs from the target voltage setting circuit 7. The third input terminal of the safing FET control circuit 6 is connected with an output terminal of the target voltage setting circuit 7. As described above, the safing FET control circuit 6 further has the output terminal connected with the gate terminal of the safing FET 5.

The safing FET control circuit 6 controls the safing FET 5 so that the safing FET 5 outputs a voltage equal to the target voltage Vs from the source terminal based on the feedback signal from the safing FET 5. Herein, the feedback signal is the source voltage of the safing FET 5, which is input to the safing FET control circuit 6 via the second input terminal. The safing FET control circuit 6 functions as a safing switch control circuit.

The high side FET 112 connected with the squib 113 is a switching element and controls a current flowing through the squib 113. The drain terminal of the high side FET 112 is connected with the source terminal of the safing FET 5. Thus, the source voltage of the safing FET 5 is applied to the drain terminal of the high side FET 112. A source terminal of the high side FET 112 is connected with a first end 113a of the squib 113, and a gate terminal of the high side FET 112 is connected with an output terminal of the first control circuit 111. The high side FET 112 functions as a high side switching element.

When the first control circuit 111 receives the activation command from the microcomputer M, the first control circuit 111 drives and controls the high side FET 112 so that a current flowing through the squib 113 becomes a predetermined current Isq under which the squib 113 is fired. Hereinafter, the predetermined current Isq under which the squib 113 is fired is also referred to as an activation current Isq. A value of the activation current Isq may be appropriately set under a condition that the airbag apparatus 100 is activated within a required time. In the present embodiment, the value of the activation current Isq is set to 1.2 amperes (A) as an example. As described above, the input terminal of the first control circuits 111 is connected with the output terminal of the microcomputer M, and the output terminal of the first control circuit 111 is connected with the gate terminal of the high side FET 112. The first control circuit 111 functions as a high side switch control circuit.

The low side FET 115 connected with the squib 113 is a switching element, and connects the squib 113 to the earth. A drain terminal of the low side FET 115 is connected with a second end 113b of the squib 113, and a source terminal of the low side FET 115 is connected with the earth. Further, a gate terminal of the low side FET 115 is connected with an output terminal of the second control circuit 114.

When the second control circuit 114 receives the activation command from the microcomputer M, the second control circuit 114 drives the low side FET 115. As described above, the input terminal of the second control circuit 114 is connected with the output terminal of the microcomputer M, and the output terminal of the second control circuit 114 is connected with the gate terminal of the low side FET 115.

The squib 113 is an element to inflate an airbag (not shown) of the airbag apparatus 100. Specifically, when the activation current Isq flows through the squib 113 for a predetermined time, for example, 2 milliseconds, the squib 113 is fired and the airbag is inflated. The first end 113a of the squib 113 is connected with the source terminal of the high side FET 112, and the second end 113b of the squib 113 is connected with the drain terminal of the low side FET 115. The first end 113a and the second end 113b of the squib 113 are also connected with input terminals of the terminal voltage monitoring section 9, which will be described later.

The channel 12, 13 has the same configuration with the channel 11 as described above. Thus, a description of the configuration of other channels 12, 13 is omitted. Further, in the following description, the channel 11 is used as an example of the multiple channels 11, 12, 13 included in the airbag apparatus 100 to describe an operation of the airbag apparatus 100.

Figure 2:
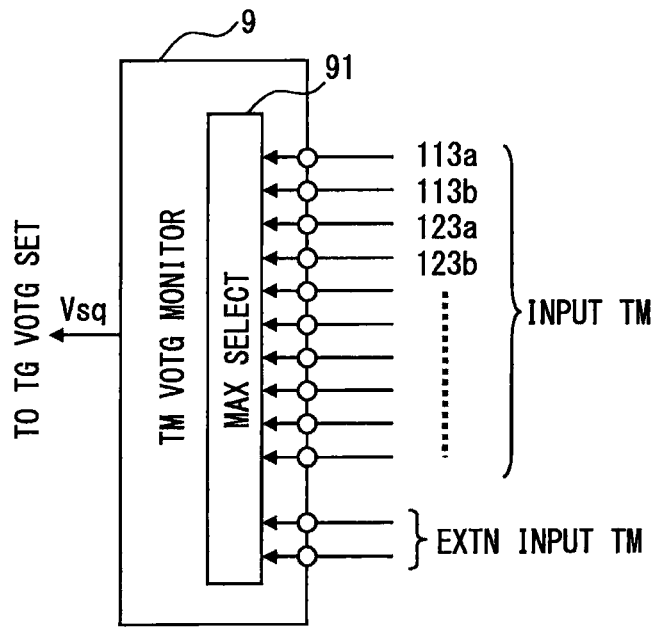
FIG. 2 is a diagram showing a configuration of a terminal voltage monitoring section of the airbag apparatus of FIG. 1.

As shown in FIG. 2, the terminal voltage monitoring section 9 includes a maximum value selection circuit (MAX SELECT) 91 and multiple input terminals (INPUT TM). The terminal voltage monitoring section 9 detects a voltage at each of the first end 113a, 123a and the second end 113b, 123b of each squib 113, 123. The voltages at the first end 113a and the second end 113b of the squib 113 included in the channel 11 are input to the terminal voltage monitoring section 9 via the multiple input terminals of the terminal voltage monitoring section 9. The terminal voltage monitoring section 9 needs two input terminals in order to receive respective end voltages of the squib 113. Thus, when the number of the channels included in the airbag apparatus 100 is N, the number of the input terminals included in the terminal voltage monitoring section 9 is 2×N. The terminal voltage monitoring section 9 functions as a terminal voltage acquiring circuit. In the present embodiment, the terminal voltage monitoring section 9 detects both the voltage at the first end 113a of the squib 113 and the voltage at the second end 113b of the squib 113. Further, the terminal voltage monitoring section 9 may detect at least one of the voltage at the first end 113a of the squib 113 or the voltage at the second end 113b of the squib 113.

As shown in FIG. 2, the voltages at each end 113a, 113b, 123a, 123b of the squib 113, 123 are input to the maximum value selection circuit 91 via the multiple input terminals. The maximum value selection circuit 91 selects a maximum voltage Vsq from the multiple voltages input from the ends of the multiple squibs 113, 123. For example, the maximum value selection circuit 91 may be provided by a well-known analog circuit disclosed in JP 2006-59750 A (corresponding to US 2006/038592 A1). The terminal voltage monitoring section 9 has an output terminal connected with a first input terminal of the target voltage setting circuit 7. The maximum voltage Vsq, which is selected among the multiple voltages input from the multiple squibs 113, 123 via the multiple input terminals of the terminal voltage monitoring section 9, is output to the target voltage setting circuit 7. Since the multiple voltages are voltages at end terminals of the squib 113, the voltages input to the terminal voltage monitoring section 9 are also referred to as terminal voltages, and the maximum voltage Vsq among the terminal voltages is also referred to as maximum terminal voltage Vsq. The maximum value selection circuit 91 functions as a maximum voltage selection section.

In the present embodiment, the multiple channels 11, 12, 13 are included in one integrated circuit. The airbag apparatus 100 used in the actual practice has many channels. Thus, in the actual airbag apparatus 100 used in the actual practice, the many channels may be provided by multiple integrated circuits.

When many channels are provided by multiple integrated circuits, the terminal voltage monitoring section 9 may further include extension input terminals (EXTN INPUT TM) to input voltages acquired from the ends of the squibs included in other channels included in other integrated circuits to the maximum value selection circuit 91. In this case, the terminal voltage monitoring section 9 may be arranged in any one of the integrated circuits. The integrated circuit that includes the terminal voltage monitoring section 9 is also referred to as a subject integrated circuit. The subject integrated circuit includes the extension input terminals to receive the voltages at the ends of the squibs included in the channels of other integrated circuits. Thus, a cost for arranging the terminal voltage monitoring sections 9 to other integrated circuits is reduced.

The reference power supplying section 8 has a negative electrode terminal connected with the body of the vehicle and a positive electrode terminal connected with a second input terminal of the target voltage setting circuit 7. An output voltage Vref of the reference power supplying section 8 is lower than the maximum value of the output voltage Vo of the battery 1. At the same time, the output voltage Vref of the reference power supplying section 8 has a value high enough to supply the activation current Isq to the squib 113. The voltage Vref output from the reference power supplying section 8 is also referred to as a reference voltage. In the present embodiment, the reference voltage Vref is determined based on the following expression 1.

$$Vref = Isq \times (Rsq + Rfet \times 2 + Rh) \qquad \text{(Expression 1)}$$

In expression 1, Isq represents the activation current necessary for firing the squib 113 within the required time. As described above, in the present embodiment, the activation current Isq has a value of 1.2 A. Rsq represents a resistance of the squib 113, and has a value of 4 ohms (Ω). Rfet represents a resistance of the switching element, such as the high side FET 112 or the low side FET 115, and has a value of 2Ω for each FET. In a current flowing path of the activation current Isq in the channel 11, the high side FET 112, the squib 113, and the low side FET 115 are connected in series. Thus, a combined resistance value of the high side FET 112, the squib 113, and the low side FET 115 are calculated by adding the resistances of the high side FET 112, the squib 113, and the low side FET 115 together. Further, Rh represents a resistance of a harness that connects each component to another component. For example, Rh has a value of 1Ω. The reference voltage Vref has an approximate value of 11 V when each parameter in expression 1 has the above-described value. Thus, in the present embodiment, the reference voltage Vref output from the reference power supplying section 8 has a value of 11 V.

The target voltage setting circuit 7 sets the target voltage Vs, and the safing FET control circuit 6 controls the voltage output from the source terminal of the safing FET 5 based on the target voltage Vs. The second input terminal of the target voltage setting circuit 7 is connected with the positive electrode terminal of the reference power supplying section 8, and the reference voltage Vref is input to the target voltage setting circuit 7. The first input terminal of the target voltage setting circuit 7 is connected with the output terminal of the terminal voltage monitoring section 9, and the maximum terminal voltage Vsq detected by the terminal voltage monitoring section 9 is input to the target voltage setting circuit 7.

The output terminal of the target voltage setting circuit 7 is connected with the third input terminal of the safing FET control circuit 6. The target voltage setting circuit 7 selects one voltage having a higher value between the reference voltage Vref input from the reference power supplying section 8 via the second input terminal and the maximum terminal voltage Vsq input from the terminal voltage monitoring section 9 via the first input terminal. Specifically, the target voltage setting circuit 7 is provided by a circuit that selects a maximum value among multiple inputs. For example, the target voltage setting circuit 7 may be provided by a well-known maximum value selection circuit. That is, the target voltage setting circuit 7 outputs the one voltage having a higher value between the reference voltage Vref and the maximum terminal voltage Vsq as the target voltage Vs to the safing FET control circuit 6.

Figure 3:
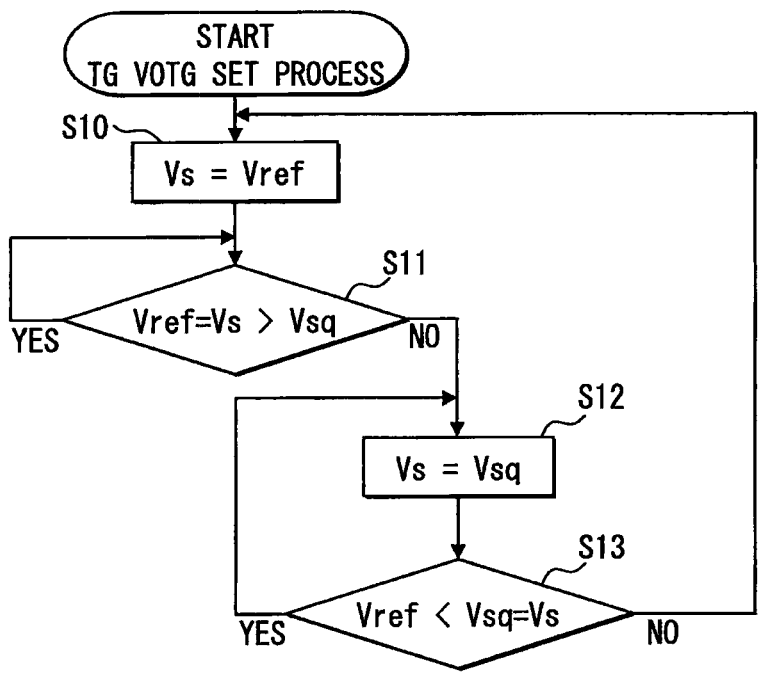
FIG. 3 is a flow chart showing a target voltage setting process executed by a target voltage setting circuit of the airbag apparatus.

The following will describe an operation of the target voltage setting circuit 7 with reference to FIG. 3. The target voltage setting circuit 7 repeatedly executes a target voltage setting process (TG VOTG SET PROCESS) shown in FIG. 3 during an ignition switch (not shown) of the vehicle is in an on state regardless of whether the safing FET control circuit 6 is in an operation state or not. At S10, the target voltage setting circuit 7 sets the target voltage Vs when the channel 11 is in a properly operating state. Herein, the properly operating state is a state in which a voltage lower than the reference voltage Vref is applied to the first end 113a and the second end 113b of the squib 113, and an improperly operating state is a state in which a voltage equal to or higher than the reference voltage Vref is applied to the first end 113a and the second end 113 of the squib 113 caused by, such as, a short circuit of the battery 1. Specifically, at S10, the target voltage setting circuit 7 sets the target voltage Vs equal to the reference voltage Vref. At S11, the target voltage setting circuit 7 compares the reference voltage Vref, which is set to the target voltage Vs, with the maximum terminal voltage Vsq. Specifically, the target voltage setting circuit 7 determines whether the reference voltage Vref is higher than the maximum terminal voltage Vsq. At S11, when the target voltage setting circuit 7 determines that the reference voltage Vref is higher than the maximum terminal voltage Vsq (S11: YES), the target voltage setting circuit 7 stands by at S11 and maintains the target voltage Vs that is equal to the reference voltage Vref. At S11, when the target voltage setting circuit 7 determines that the maximum terminal voltage Vsq is equal to or higher than the reference voltage Vref (S11: NO), the target voltage setting circuit 7 proceeds to S12.

At S12, the target voltage setting circuit 7 sets the target voltage Vs equal to the maximum terminal voltage Vsq, and outputs the target voltage Vs to the safing FET control circuit 6. At S13, the target voltage setting circuit 7 compares the maximum terminal voltage Vsq, which is set to the target voltage Vs, with the reference voltage Vref. Specifically, the target voltage setting circuit 7 determines whether the maximum terminal voltage Vsq is higher than the reference voltage Vref. At S13, when the target voltage setting circuit 7 determines that the maximum terminal voltage Vsq is higher than the reference voltage Vref (S13: YES), the target voltage setting circuit 7 returns to S12 and updates the target voltage Vs so that the target voltage Vs is equal to the maximum terminal voltage Vsq. At S13, when the target voltage setting circuit 7 determines that the maximum terminal voltage Vsq is equal to or lower than the reference voltage Vref (S13: NO), the target voltage setting circuit 7 ends the process.

Figure 4:
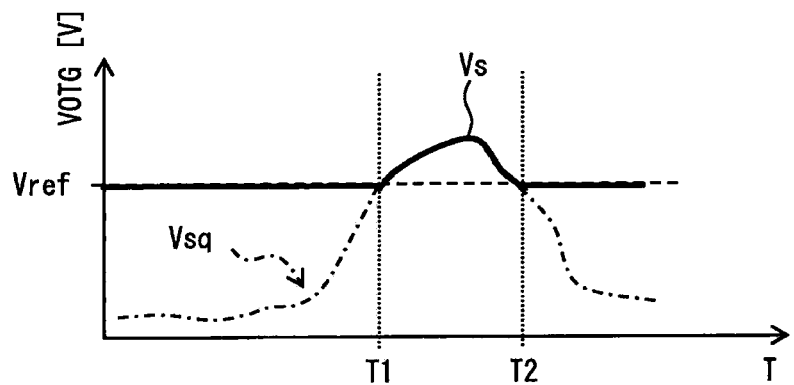
FIG. 4 is a diagram showing a target voltage set by the target voltage setting circuit over time.

Thus, in the properly operating state of the airbag apparatus 100, the target voltage Vs is equal to the reference voltage Vref. Further, during the maximum terminal voltage Vsq is higher than the reference voltage Vref (S13: YES), the target voltage setting circuit 7 repeatedly executes S12 and S13. That is, a change in the maximum terminal voltage Vsq is successively reflected in the voltage being input to the target voltage setting circuit 7. Thus, the target voltage Vs output from the target voltage setting circuit 7 changes linearly as shown in FIG. 4. In FIG. 4, the reference voltage Vref is shown by a dashed line, the maximum terminal voltage Vsq is shown by a dashed dotted line, and the target voltage Vs output from the target voltage setting circuit 7 is shown by a bold line. For example, until a time point T1, the reference voltage Vref is higher than the maximum terminal voltage Vsq. Thus, the target voltage setting circuit 7 outputs the reference voltage Vref as the target voltage Vs. After the time point T1 when the maximum terminal voltage Vsq becomes equal to the reference voltage Vref, the target voltage setting circuit 7 sets the target voltage Vs so that the target voltage Vs traces the maximum terminal voltage Vsq during a time period from the time point T1 to a time point T2 when the maximum terminal voltage Vsq becomes equal to the reference voltage Vref again. After the time point T2, the reference voltage Vref is higher than the maximum terminal voltage Vsq. Thus, the target voltage setting circuit 7 outputs the reference voltage Vref as the target voltage Vs.

The following will describe an operation of the airbag apparatus 100 according to the present embodiment relative to the target voltage setting process. In FIG. 1, when the ignition switch (not shown) is turned on, the output voltage Vo of the battery 1 is boosted by the boosting circuit 2, and is supplied to the airbag apparatus 100. Further, when the ignition switch (not shown) is turned on, various sensors (not shown) equipped to the vehicle and the microcomputer M are activated. As described above, the target voltage setting circuit 7 successively compares the maximum terminal voltage Vsq acquired from the terminal voltage monitoring section 9 with the reference voltage Vref, and outputs the one voltage having a higher value as the target voltage Vs to the safing FET control circuit 6.

When the vehicle crash occurs, the microcomputer M detects the vehicle crash based on signals from the various sensors, and outputs the activation command in order to fire each squib 113, 123 included in each channel 11, 12, 13. When the microcomputer M outputs the activation command, the safing FET control circuit 6 drives the safing FET 5 and controls the safing FET 5 to output the target voltage Vs from the source terminal. Further, the first control circuit 111 and the second control circuit 114, respectively, control the high side FET 112 and the low side FET 115 so that the current flowing through the squib 113 increases to the activation current Isq. In the present embodiment, the activation current Isq has the value of 1.2 A. When the activation current Isq having the value of 1.2 A flows through the squib 113, the squib is fired, and the airbag (not shown) of the airbag apparatus 100 is inflated by the firing of the squib 113. Other channels 12, 13 operate in a similar way with the channel 11 as described above.

During the process to inflate the airbag of the airbag apparatus 100, when the voltage applied to the ends of each squib 113 is lower than the reference voltage Vref, the target voltage Vs is set equal to the reference voltage Vref. Thus, the reference voltage Vref is supplied to the high side FET 112, 122 of each channel 11, 12, 13. Further, when the voltage applied to the ends of each squib 113 is equal to or higher than the reference voltage Vref, the target voltage Vs is set equal to the maximum terminal voltage Vsq. Thus, the maximum terminal voltage Vsq is supplied to the high side FET 112, 122 of each channel 11, 12, 13.

The following will describe a conventional configuration of an airbag apparatus with reference to FIG. 1. Suppose that, in the channel 11, a short circuit occurs in a current path between the source terminal of the high side FET 112 and the drain terminal of the low side FET 115. In this case, the output voltage Vo of the battery 1 is applied to the source terminal of the high side FET 112.

In the short-circuited channel 11, in a case where the target voltage Vs is set lower than the output voltage Vo of the battery 1, a potential at the source terminal of the high side FET 112 is higher than a potential at the drain terminal of the high side FET 112 when the high side FET 112 is turned on. Thus, a reverse current flows through the high side FET 112 when the high side FET 112 is turned on. The reverse current with the battery 1 as a power supplying source further flows into another channel, such as channel 12. At this time, the current is concentrated at the high side FET 112 of the channel 11, and the high side FET 112 may break by the concentrated current.

In the conventional configuration, the target voltage Vs is always set higher than a maximum value of the output voltage Vo of the battery 1 in order to avoid a generation of the reverse current. As described above, the maximum value of the output voltage Vo is estimated as 16V. Thus, the target voltage Vs is always set higher than 16V. As well known, a size of a switching element, such as FET, increases with an increase of the applied voltage. Thus, in the conventional configuration, a high side switching element corresponding to the high side FET 112, 122 included in each channel 11, 12, 13 of the present disclosure has a size corresponding to a voltage higher than the maximum value (16 V) of the output voltage Vo.

In the present embodiment, when a voltage higher than the reference voltage Vref is applied to the ends of the squib 113 caused by the short circuit of the battery 1, the terminal voltage acquiring circuit 9 acquires the maximum terminal voltage Vsq and the target voltage setting circuit 7 sets the target voltage Vs equal to the maximum terminal voltage Vsq. That is, the target voltage setting circuit 7 sets the target voltage Vs corresponding to the maximum terminal voltage Vsq so that the reverse current is not generated in the high side FET 112. Thus, the reverse current is avoided to be generated in the high side FET 112. Thus, a flow of the reverse current through the high side FET 112 is restricted.

Further, in the properly operating state, the target voltage Vs is set equal to the reference voltage Vref. That is, in the properly operating state, the target voltage Vs is set lower than the maximum value of the output voltage Vo of the battery 1. The high side FET included in each channel, which functions as an activation circuit of the squib, is required to allow only the reference voltage Vref. That is, the high side FET included in each channel is not necessarily required to always allow a voltage higher than the maximum value of the output voltage Vo of the battery 1. That is, the high side FET in the present embodiment is required to allow the voltage that is lower than the target voltage according to the conventional configuration. Thus, a size of the high side FET can be reduced with the configuration of the present embodiment. Accordingly, a size of the activation circuit to fire the squib is also reduced with a reduction in the size of the high side FET.

In the present embodiment, when the maximum terminal voltage Vsq becomes higher than the reference voltage Vref, the target voltage Vs is set equal to the maximum terminal voltage Vsq. As described above, when the short circuit of the battery 1 occurs, the maximum terminal voltage Vsq increases and becomes higher than the reference voltage Vref. Thus, the short circuit of the battery 1 corresponds to a case in which the target voltage setting circuit 7 determines NO at S11. Further, the target voltage Vs may be set to a value other than a value equal to the maximum terminal voltage Vsq. Specifically, the target voltage Vs may be set higher than a voltage obtained by subtracting a predetermined voltage from the maximum terminal voltage Vsq.

(Modification)

For example, the target voltage Vs may be set appropriately based on the following expression 2 when the short circuit of the battery 1 occurs. Generally, in a FET, a voltage drop is generated by a parasitic diode existing in a path through which the reverse current flows. Thus, when the short circuit of the battery 1 occurs, the target voltage Vs may be set with consideration of the voltage drop (diode drop) caused by the parasitic diode of the high side FET. Specifically, when the short circuit of the battery 1 occurs, the target voltage Vs may be set appropriately within a range satisfying the following expression 2.

$$Vs > Vsq - Vf \quad \text{(Expression 2)}$$

In expression 2, Vsq represents an output voltage Vo of the battery 1 when the short circuit of the battery 1 occurs. Further, Vf represents the voltage drop caused by the parasitic diode of the high side FET.

Other Embodiments

Further, when the short circuit of the battery 1 occurs, the target voltage Vs may be set equal to a sum of the maximum terminal voltage Vsq and a predetermined tolerance value, such as 1 V. However, when the target voltage Vs is set equal to the sum of the predetermined tolerance value and the maximum terminal voltage Vsq, the high side FET 112 is required to tolerate a higher voltage compared with a case in which the target voltage Vs is set equal to the maximum terminal voltage Vsq. Accordingly, when the target voltage Vs is set equal to the sum of the predetermined tolerance value and the maximum terminal voltage Vsq, heat generated by the high side FET is greater compared with a case in which the target voltage Vs is set equal to the maximum terminal voltage Vsq. Thus, in order to reduce the heat generated by the high side FEE, when the short circuit of the battery 1 occurs, the target voltage Vs is set as low as possible under a condition that the reverse current flowing through the high side FET is restricted.

Further, performance of the high side FET 112 is decided under a condition that the high side FET 112 is tolerable to the reference voltage Vref in the properly operating state. Usually, when each FET 5, 112, 115 turns under the target voltage Vs having an abnormal value (that is the target voltage Vs is set equal to the maximum terminal voltage Vsq), the maximum terminal voltage Vsq higher than the tolerable voltage of the high side FET 112 is applied to the high side FET 112. At this time, a thermal shutdown may occur to the high side FET 112 corresponding to the maximum terminal voltage Vsq. In the present disclosure, the target voltage Vs is set to trace the maximum terminal voltage Vsq in a linear manner. Thus, even when the voltage higher than the tolerable voltage of the high side FET 112 is applied to the high side FET 112, the activation current Isq is able to flow through the squib 113 for the predetermined time, and a possibility to fire the squib 113 and accordingly inflate the airbag of the airbag apparatus 100 is increased.

In the present disclosure, the reference voltage Vref has the value of 11 V. Further, the value of the reference voltage may be set appropriately under a condition that the reference voltage Vref is lower than the maximum value of the output voltage Vo of the battery 1. For example, the reference voltage may be set to 12 V. In the present disclosure, the voltage reference voltage Vref is defined based on the activation current Isq to fire the squib 113, and the resistances of the current path of the activation current Isq. Thus, the voltage applied to the source terminal of the high side FET 112 can be decreased to the limits. That is, the size of the high side FET 112 included in the activation circuit can be reduced by reducing the estimated voltage to be applied to the high side FET 112. Accordingly, the size of the whole circuit can be reduced. For example, the size of the whole circuit may be reduced by 50% by reducing the estimated voltage to be applied to the high side FET 12 from 16 V to 11 V.

Further, a resistance of the switching element, such as a FET, is likely to increase with a decrease in a size of the switching element. Thus, the resistance Rfet of the switching element, such as the FET, used to calculate the reference voltage Vref increases when the size of the switching element is reduced by reducing the reference voltage Vref in the properly operating state. Thus, a minimum value of the reference voltage Vref increases with the increase of the resistance Rfet. Thus, the size of the switching element may be converged to a predetermined size. In the present disclosure, with consideration of the trade-off relationship, the reference voltage Vref is converged to a predetermined value in order to reduce the size of the activation circuit.

Figure 5:
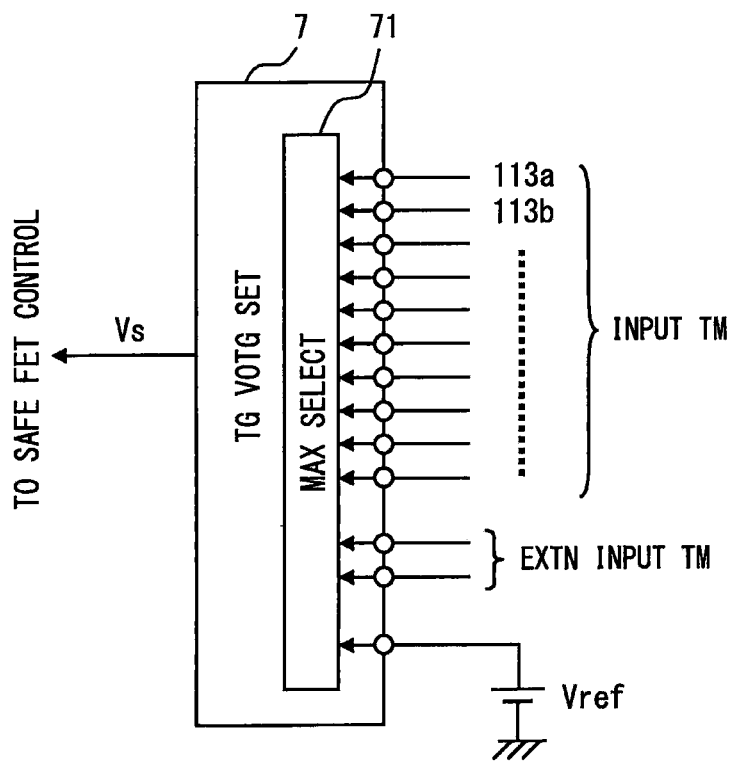
FIG. 5 is a diagram showing a configuration of a target voltage setting circuit of an airbag apparatus according to another embodiment of the present disclosure.

In the present disclosure, the maximum terminal voltage Vsq is selected by the maximum value selection circuit 91 from the multiple voltages input via the multiple input terminals of the terminal voltage monitoring section 9. Then, the reference voltage Vref and the maximum terminal voltage Vsq is input to the target voltage setting circuit 7. Further, as shown in FIG. 5, the target voltage setting circuit 7 may have a maximum value selection circuit (MAX SELECT) 71, and the reference voltage Vref together with the voltages of the multiple squibs may be input to the maximum value selection circuit 71. In the example shown in FIG. 5, the terminal voltage monitoring section 9 is included in the target voltage setting circuit 7.

With this configuration, the reference voltage Vref is selected by the maximum value selection circuit 71, and is input to the safing FET control circuit 6 in the properly operation state. Further, when one of the voltages input from the ends of the squibs is equal to or higher than the reference voltage Vref, the voltage is selected by the maximum value selection circuit 71, and is input to the safing FET control circuit 6. Thus, the target voltage setting circuit 7 and the terminal voltage monitoring section 9 can be achieved by one maximum value selection circuit. Thus, the number of the maximum value selection circuits included in the airbag apparatus 100 can be reduced.

While only the selected exemplary embodiments have been chosen to illustrate the present disclosure, it will be apparent to those skilled in the art from this disclosure that various changes and modifications can be made therein without departing from the scope of the disclosure as defined in the appended claims. Furthermore, the foregoing description of the exemplary embodiments according to the present disclosure is provided for illustration only, and not for the purpose of limiting the disclosure as defined by the appended claims and their equivalents.

What is claimed is:

1. An airbag apparatus, which is connected with a battery, comprising:
   a plurality of activation circuits, each of which includes a squib having a first end and a second end, a high side switching element connected with the first end of the squib, and a high side switch control circuit that drives and controls the high side switching element so that a predetermined activation current flows through the squib;
   a safing switching element connected between the battery and the activation circuits;
   a safing switch control circuit that drives and controls the safing switching element to provide a target voltage to each of the activation circuits;
   a terminal voltage acquiring circuit that acquires a plurality of terminal voltages respectively output from the activation circuits, each of the terminal voltages being provided by at least one of a voltage at the first end of the squib or a voltage at the second end of the squib; and
   a target voltage setting circuit that sets the target voltage to be provided to each of the activation circuits,
   wherein the target voltage setting circuit receives a reference voltage for generating the activation current to flow through the squib, and the reference voltage is lower than a maximum output voltage of the battery,
   wherein the terminal voltage acquiring circuit compares the reference voltage with a maximum terminal voltage that has a maximum value among the terminal voltages,
   wherein, when the maximum terminal voltage is lower than the reference voltage, the target voltage setting circuit sets the target voltage to be equal to the reference voltage, and
   wherein, when the maximum terminal voltage is higher than the reference voltage, the target voltage setting circuit sets the target voltage to correspond to the maximum terminal voltage so that a reverse current is avoided in the high side switching element.

2. The airbag apparatus according to claim 1,
   wherein the predetermined voltage is set equal to a voltage drop caused by a parasitic diode of the high side switching element, and
   wherein, when the maximum terminal voltage is higher than the reference voltage, the target voltage setting circuit sets the target voltage to be higher than a voltage obtained by subtracting the voltage drop from the maximum terminal voltage.

3. The airbag apparatus according to claim 1, further comprising
a maximum voltage selection section selecting the maximum terminal voltage from the terminal voltages that are output from the activation circuits and outputting the maximum terminal voltage to the target voltage setting circuit.

4. The airbag apparatus according to claim 1,
wherein, when the maximum terminal voltage is higher than the reference voltage, the target voltage setting circuit sets the target voltage to correspond to the maximum terminal voltage so that the target voltage traces a change in the maximum terminal voltage.

5. The airbag apparatus according to claim 4,
wherein, when the maximum terminal voltage is higher than the reference voltage, the target voltage setting circuit sets the target voltage to be equal to the maximum terminal voltage.

6. The airbag apparatus according to claim 1,
wherein the reference voltage is determined based on the activation current and resistances of an electronic component and a wiring included in a current path of the activation current.

7. The airbag apparatus according to claim 1,
wherein a size of the high speed switching element and a size of the plurality of activation circuits is reduced.

* * * * *

UNITED STATES PATENT AND TRADEMARK OFFICE
CERTIFICATE OF CORRECTION

PATENT NO. : 9,145,104 B2
APPLICATION NO. : 14/204069
DATED : September 29, 2015
INVENTOR(S) : Ito et al.

It is certified that error appears in the above-identified patent and that said Letters Patent is hereby corrected as shown below:

On the title page, item (71) should read:

DENSO CORPORATION, Kariya, Aichi-pref. (JP);
Pierre Turpin, Toulouse (FR);
Erwan Hemon, Goyrans (FR);
Ahmed Hamada, Toulouse (FR)

Signed and Sealed this
Twenty-fourth Day of May, 2016

Michelle K. Lee
*Director of the United States Patent and Trademark Office*